United States Patent
Watanabe et al.

(10) Patent No.: US 6,415,478 B1
(45) Date of Patent: Jul. 9, 2002

(54) ASSIST GRIP ATTACHMENT STRUCTURE METHOD

(75) Inventors: Toshimitsu Watanabe; Takumi Endo, both of Kariya (JP)

(73) Assignee: Toyoda Boshoku Corporation, Kariya (JP)

( * ) Notice: Subject to any disclaimer, the term of this patent is extended or adjusted under 35 U.S.C. 154(b) by 0 days.

(21) Appl. No.: 09/705,951

(22) Filed: Nov. 6, 2000

(30) Foreign Application Priority Data

Nov. 10, 1999 (JP) ............................................ 11-320034

(51) Int. Cl.[7] ............................. B62B 7/00; A45C 13/26
(52) U.S. Cl. ............................ 16/444; 16/443; 16/419; 16/383; 16/DIG. 24; 16/DIG. 44; 403/297; 411/45
(58) Field of Search ........................... 16/444, 443, 410, 16/415, 419, 383, DIG. 24, DIG. 41; 411/41, 45–48; 296/214, 71, 39.1, 210, 97.1; 188/290; 403/251, 252, 297; 49/460, 502

(56) References Cited

U.S. PATENT DOCUMENTS

| | | | | |
|---|---|---|---|---|
| 5,507,545 A | * | 4/1996 | Krysiak | 411/41 |
| 5,560,669 A | * | 10/1996 | Gute | 411/45 |
| 5,567,098 A | * | 10/1996 | Gordon | 411/48 |
| 5,775,860 A | * | 7/1998 | Meyer | 411/46 |
| 5,855,347 A | * | 1/1999 | Hollingsworth et al. | 411/60 |
| 5,881,982 A | * | 3/1999 | Hollingsworth et al. | 411/45 |
| 5,920,957 A | * | 7/1999 | Wagner | 411/45 |
| 6,122,815 A | * | 9/2000 | Kownacki et al. | 411/44 |
| 6,176,660 B1 | * | 1/2001 | Lewis et al. | 411/45 |

FOREIGN PATENT DOCUMENTS

| | | |
|---|---|---|
| JP | 6-293232 | 10/1994 |
| JP | 7-267010 | 10/1995 |
| JP | 10-292807 | 11/1998 |

* cited by examiner

Primary Examiner—Chuck Y. Mah
(74) Attorney, Agent, or Firm—Oliff & Berridge PLC

(57) ABSTRACT

An attachment structure for attaching an assist grip to a vehicle body is provided wherein the assist grip has a contractible member formed integrally on its grip body such that the contractible member includes large-width portions and small-width portions. The large-width portions have a larger width than attachment holes of a ceiling base member and the vehicle body when the contractible member is in the normal state, but the width of the large-width portions may be reduced to be smaller than those of the attachment holes when the contractible member is contracted. The small-width portions have a smaller width than the attachment holes so as to be fitted in the holes. After fitting the contractible member into the attachment hole of the vehicle body, a lock pin is inserted into a space formed in the contractible member so as to restrict contraction of the contractible member.

7 Claims, 7 Drawing Sheets

ASSIST GRIP ATTACHMENT STRUCTURE METHOD

INCORPORATION BY REFERENCE

The disclosure of Japanese Patent Application No. 11-320034 filed on Nov. 10, 1999 including the specification, drawings and abstract is incorporated herein by reference in its entirety.

BACKGROUND OF THE INVENTION

1. Field of the Invention

The present invention relates to a structure and a method for attaching an assist grip to a vehicle body via a ceiling base member, and more particularly, to an attachment structure for an assist grip having a contractible member as an attachment portion formed integrally with a grip body, wherein the contractible member is inserted into an attachment hole of the vehicle body.

2. Discussion of Related Art

In general, an assist grip to be mounted in a vehicle compartment (typically, on the ceiling) has a bolt-nut attachment structure. Such an assist grip is mounted in place by aligning an attachment hole of the assist grip with a nut welded to the vehicle body, and fastening a bolt into the nut.

With the bolt-nut attachment structure, however, the assist grip is attached to the ceiling with a poor work efficiency since workmen usually look up or turn the face upward so as to fasten the bolt into the nut. In view of this problem, an attachment structure that provides an improved work efficiency is proposed in Japanese Patent Laid-Open Publication No. HEI 10-292807.

The attachment structure disclosed in Japanese Patent Laid-Open Publication No. HEI 10-292807 principally consists of a pin member 100 and a grommet 102 as shown in FIGS. 6A and 6B.

The pin member 100 and the grommet 102 are both formed of synthetic resin. To attach the assist grip to the ceiling using the pin member 100 and the grommet 102, a substrate 104 of the grommet 102 is initially bonded (at its top surface as viewed in the figure) to a ceiling base member 200, and in this state a leg portion 106 of the grommet 102 is inserted through an attachment hole 204 of a vehicle body 202 (inner panel). Upon the insertion, elastically-deformable stop claws 108 are brought into engagement with the periphery of the attachment hole 204 such that the ceiling base member 200 is tentatively fixed with respect to the vehicle body 202.

Subsequently, an attachment hole 208 of the assist grip 206 is aligned with a receiving hole 110 of the grommet 102, and an insertion shaft 112 of the pin member 100 is inserted into the attachment hole 208 and receiving hole 110. During the insertion, engaging claws 114 formed at the distal end portion of the insertion shaft 112 are moved in the axial direction while being guided by respective slits 116 so that the leg portion 106 of the grommet 102 is expandable radially outwards.

In this manner, the assist grip 206 and the ceiling base member 200 are sandwiched between a head 118 of the pin member 100 and the substrate 104 of the grommet 102.

A tool, such as a screwdriver, is put into a receiving groove 120 formed in the head 118 of the pin member 100, so that the pin member 100 is rotated by 90°. As a result, the leg portion 106 expands radially outwards, and the engaging claws 114 are fitted in respective engaging recesses 124 formed in an inner wall 122 of the leg portion 106. Thus, the pin member 100 is prevented from being disengaged from the grommet 102, and the assist grip 206 is mounted on the vehicle body 202 via the ceiling base member 200.

The above-mentioned Japanese Patent Laid-Open Publication No. HEI 10-292807 also discloses a structure in which the grommet 102 is formed integrally with the assist grip 206 in an attempt to reduce the number of components.

With the above-described attachment structure of the assist grip, it takes a lot of time and labor to bond the grommet 102 to the ceiling base member 200. Even the structure in which the grommet 102 is formed integrally with the assist grip 206 still suffers from a poor work efficiency since the pin member 100 must be rotated and locked so as to be fixed to the grommet 102. Additionally, this requires the use of a tool, such as a screwdriver.

SUMMARY OF THE INVENTION

In view of the foregoing facts, it is an object of the invention to provide an attachment structure with which an assist grip is attached to a vehicle body with an improved efficiency.

To accomplish the above object, the present invention provides an attachment structure with which an assist grip is attached to a vehicle body with a ceiling base member interposed therebetween, comprising: a grip body configured and positioned to be held by a passenger; a contractible member formed integrally with the grip body and inserted through a first attachment hole formed in the ceiling base member and a second attachment hole formed in the vehicle body, the contractible member having a space formed therein which allows the contractible member to be contracted; and an insertion member that is inserted into the space of the contractible member, to reach a locking position at which the insertion member restricts contraction of the contractible member. In this attachment structure, the contractible member includes a large-sized portion having an outside dimension that is larger than corresponding dimensions of the first and second attachment holes when the contractible member is in a normal state, and the contractible member is able to be contracted while the insertion member is not located at the locking position so that the outside dimension of the large-sized portion becomes smaller than the corresponding dimensions of the first and second attachment holes. The contractible member further includes a smallsized portion that is dimensioned to be fitted in the first and second attachment holes when the insertion member is located at the locking position.

With the attachment structure as described above, when the assist grip is attached to the vehicle body via the ceiling base member, the contractible member is contracted so that the size of the large-sized portion is reduced to be smaller than those of the first and second attachment holes. Thus, the contractible member can be inserted through the first and second attachment holes.

After the contractible member is fitted in the attachment holes, the insertion member is inserted into the space of the contractible member so as to restrict contraction of the contractible member that is now in the normal or non-contracted state. Thus, the size of the large-sized portion is kept larger than those of the first and second attachment holes. At this time, the small-sized portions of the contractible member are fitted in the first and second attachment holes, while the large-sized portions are held in engagement with the edges of the first and second attachment holes, and thus prevented from slipping out through the attachment holes.

Thus, the assist grip is attached to the vehicle body simply by fitting the contractible member formed integrally with the grip body in the first attachment hole of the ceiling base member and the second attachment hole of the body, and then inserting the insertion member into the space of the contractible member. Thus, the assist grip can be easily attached to the body with an improved efficiency.

In the attachment structure for the assist grip as described above, the contractible member may be formed from an elastic body. In this case, the contractible member is able to be elastically deformed to be contracted, and return to its normal or non-contracted state by use of its own elastic force.

During attachment of the assist grip, therefore, the contractible member restores its normal or non-contracted state from the contracted state after the member is fitted in the first and second attachment holes. Thus, the large-sized portions are brought into engagement with the first and second attachment holes even if the insertion member is not inserted into the space. Accordingly, the contractible member can be tentatively attached to the body merely by fitting the member in the first and second attachment holes, thus assuring further improved work efficiency.

With the attachment structure as described above, the attaching procedure may be changed. For example, the contractible member is first fitted in the first attachment hole of the ceiling base member so that the assist grip and the ceiling base member are assembled into a unit, and the contractible member is then fitted in the second attachment hole of the vehicle body. In this case, the ceiling base member may be attached to the vehicle body while being supported by the assist grip, thus assuring an improved efficiency in mounting the ceiling base member.

Particularly in the case where the thickness of the ceiling base member is reduced to be as small as possible, the handling ease may deteriorate, causing, for example, bending and breakage of the ceiling base member during transportation thereof. The above-mentioned attachment structure and procedure are effective in attaching such a thin ceiling base member to the vehicle body, and make it possible to further reduce the thickness and weight of the ceiling base member.

In one preferred form of the present invention, the contractible member includes a first engagement portion and a second engagement portion formed at an inner wall surface thereof. During the insertion of the insertion member into the space, an engaging portion of the insertion member engages with the first engagement portion of the contractible member when the insertion member is located at a non-locking position at which the contractible member may be contracted so that the outside dimension of the large-sized portion becomes smaller than the corresponding dimensions of the first and second attachment holes. Further, the engaging portion of the insertion member engages with the second engagement portion of the contractible member when the insertion member is located at the locking position at which the insertion member restricts contraction of the contractible member.

Thus, during attachment of the assist grip, the insertion member can be pre-mounted in the grip body by engaging the engagement portion of the insertion member with the first engagement portion. In this state, the contractible member may be contracted so as to be fitted in the first and second attachment holes.

After the contractible member is fitted in the first and second attachment holes, therefore, the assist grip can be attached to the vehicle body by merely pressing the insertion member into the space up to a locking position at which the engaging portion of the insertion member engages with the second engagement portion of the contractible member. Thus, the attaching operation is further simplified.

With the insertion member thus inserted up to the locking position, the engagement portion of the insertion member is held in engagement with the second engagement portion of the contractible member, whereby the insertion member is kept at the locking position. Thus, the insertion member can be reliably fixed in position within the space.

Moreover, pre-mounting of the insertion member in the assist grip may avoid accidents, for example, dropping or losing the insertion member during attachment operation.

In another preferred form of the invention, another member may be interposed between the vehicle body and the ceiling base member. The member thus interposed may be a shock-absorbing member, soundproof member, or the like. Where the ceiling base member has a certain air permeability, it may be used in combination with a sound-absorbing member.

In the above-described attaching procedure in which the assist grip and the ceiling base member are assembled into a unit and then attached to the vehicle body, the above-indicated member may be superposed on the ceiling base member, and then assembled as a unit with the assist grip, using an attachment hole formed in the member.

With the above arrangement, the ceiling base member achieves satisfactory handling ease and strength owing to the rigidity of the member superposed on the ceiling base member, thus assuring work efficiency with which the ceiling base member is mounted.

Moreover, since the ceiling base member and the interposing member such as a shock-absorbing member or soundproof member can be formed as separate members, these members may be easily designed and manufactured in a suitably selected method, to provide suitably selected characteristics. Depending on the manufacturing method, the interposing member, such as a shock-absorbing member or a soundproof member, may be formed integrally with the ceiling base member.

DETAILED DESCRIPTION OF THE PREFERRED EMBODIMENT

A preferred embodiment of the present invention will be described in detail with reference to the accompanying drawings.

Figure 1:
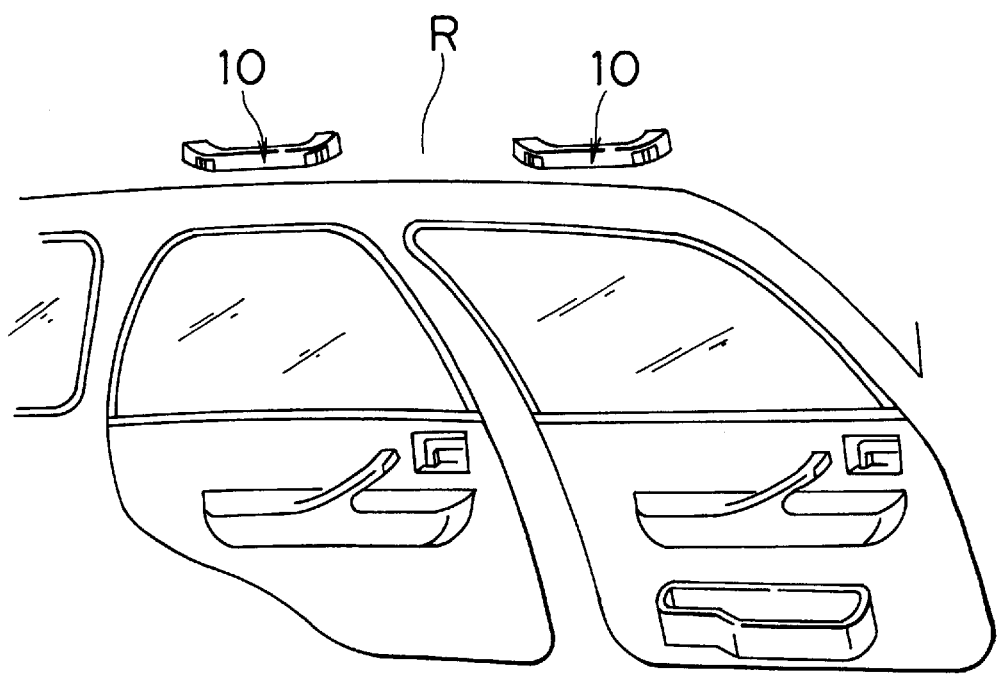
FIG. 1 is a view showing the interior of a vehicle compartment in which an assist grip is attached to the vehicle body with an attachment structure according to one embodiment of the present invention.

FIG. 1 shows, by way of example, a vehicle compartment in which an assist grip 10 is attached to a vehicle body, more particularly, a ceiling R in this case, according to one embodiment of the present invention.

Figure 2:
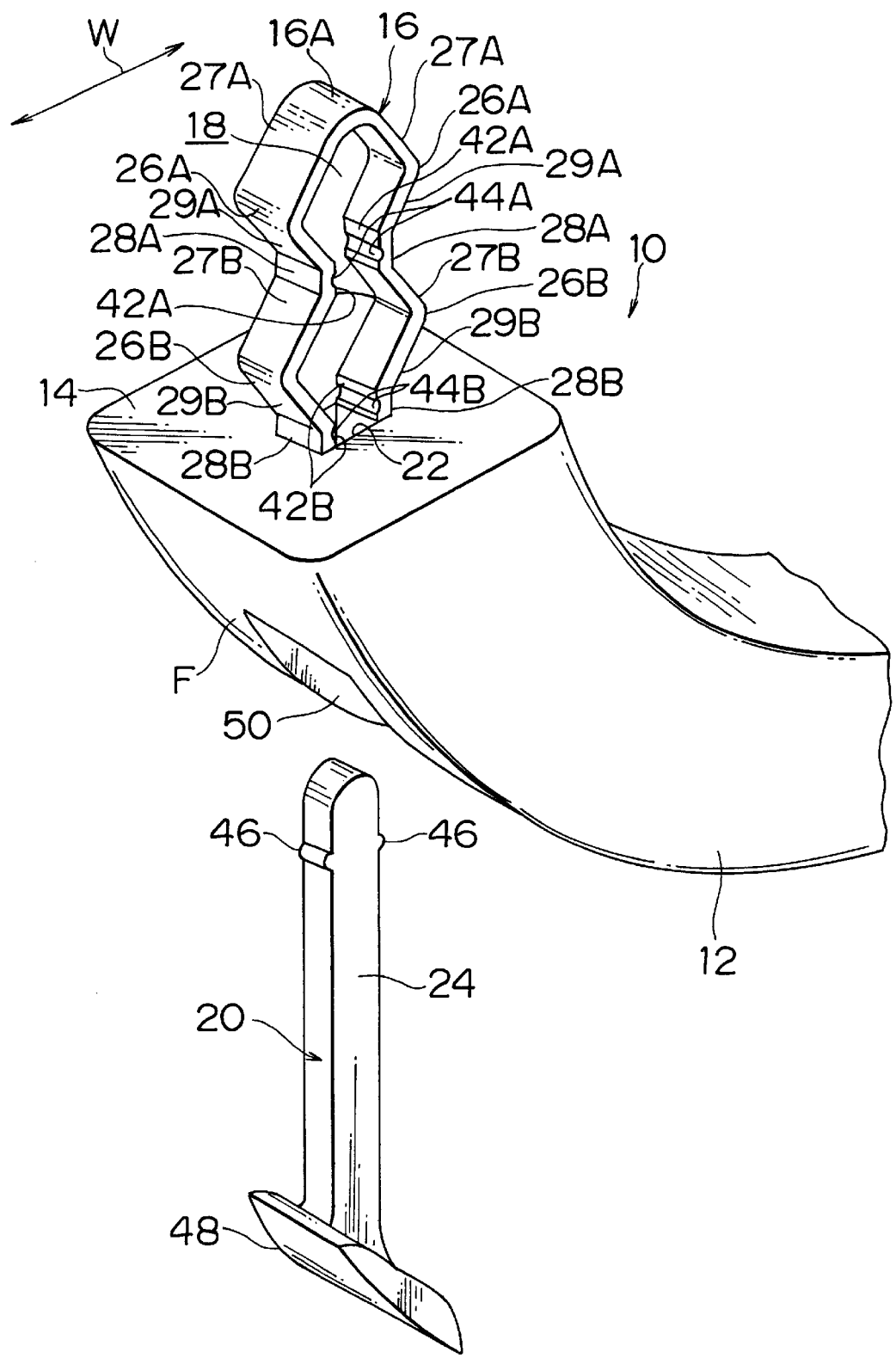
FIG. 2 is an enlarged perspective view showing the main part of the assist grip of FIG. 1.
Figure 3:
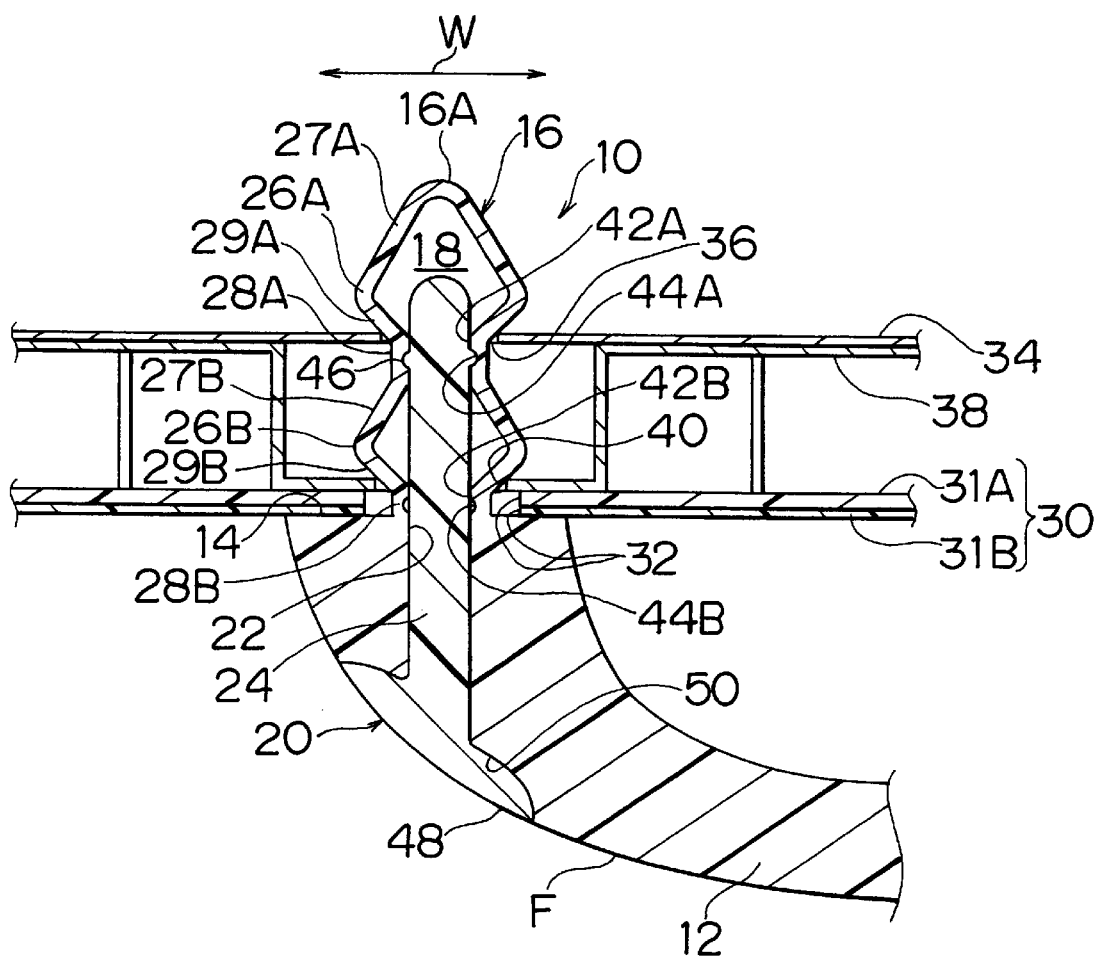
FIG. 3 is a side elevational view showing in cross section the assist grip of FIG. 1 that is attached to a ceiling base member and the vehicle body.

FIG. 2 is an exploded perspective view showing the main part of the assist grip 10. FIG. 3 is a cross-sectional view showing the main part of the assist grip 10 which is being attached to the ceiling R (FIG. 1).

The assist grip 10 is formed of synthetic resin, and principally consists of a grip body 12 serving as a grip portion, a contractible member 16 formed integrally with an attachment surface 14 of the grip body 12, and a lock pin 20 that is inserted into a space 18 formed inside the contractible member 16. The lock pin 20 may be formed of a material, such as a metal, other than the synthetic resin, so as to provide improved rigidity.

A through hole 22 is formed below the contractible member 16 to extend through the grip body 12 from the space 18 of the contractible member 16 to the front surface F of the grip body 12. The through hole 22 serves to guide the lock pin 20 when it is inserted into the space 18.

The through hole 22 has a rectangular shape in cross section, and a pin body of the lock pin 20 to be inserted into the hole 22 also has a rectangular shape in transverse cross section. The cross-sectional area of the through hole 22 is made slightly larger than that of the pin body 24 so that the lock pin 20 can be inserted into and removed from the through hole 22.

Referring to FIG. 3, the vehicle body to which the assist grip 10 is attached is constructed such that an energy absorbent (EA) member 38 is interposed between a ceiling base member 30 and a vehicle body 34. The ceiling base member 30 is formed by laminating a skin material 31B on the surface of a ceiling board 31A. The EA member 38, which serves to alleviate or reduce shocks upon collision of the vehicle, is formed of a resin, and has a honeycomb structure. As shown in FIG. 3, the EA member 38 is fitted between the ceiling base member 30 and the vehicle body 34 with substantially no gap or clearance therebetween.

Next, the main part of the present embodiment will be described in greater detail.

The contractible member 16 of the grip body 12 is formed from a thin piece of plate that protrudes upward from two opposite sides of the opening of the rectangular through hole 22 (on the side of the attachment surface 14). The thin plate is bent into a substantially 8-like shape, but the resulting contractible member 16 does not cross at its center portion, thus leaving a space of a certain width for receiving the lock pin 20.

Thus, the contractible member 16 includes large-width portions 26A, 26B that protrude outwards in the width direction (i.e., in the direction as indicated by arrow W), and small-width portions 28A, 28B having a smaller width than the large-width portions 26A, 26B.

Moreover, the contractible member 16 is tapered from the largewidth portion 26A to the distal end portion 16A and from the large-width portion 26B to the small-width portion 28A by the same cone angle, to thus provide tapered portions 27A, 27B, respectively. The contractible member 16 is likewise tapered from the large-width portion 26A to the small-width portion 28A and from the large-width portion 26B to the small-width portion 28B by the same cone angle, to thus provide tapered portions 29A, 29B, respectively.

It is to be noted that alphabets A, B suffixed to each reference numeral denoting the large-width portions, small-width portions and tapered portions represent the relative positions of the respective portions. More specifically, alphabet A indicates the upper side (closer to the distal end portion 16A of the contractible member 16), whereas alphabet B indicates the lower side (closer to the attachment surface 14 of the grip body 12).

The space 18 defined or surrounded by the expandable/contractible member 16 makes it easy for the expandable/contractible member 16 to be elastically deformed, namely, contracted and expanded in the width direction.

Figure 4:
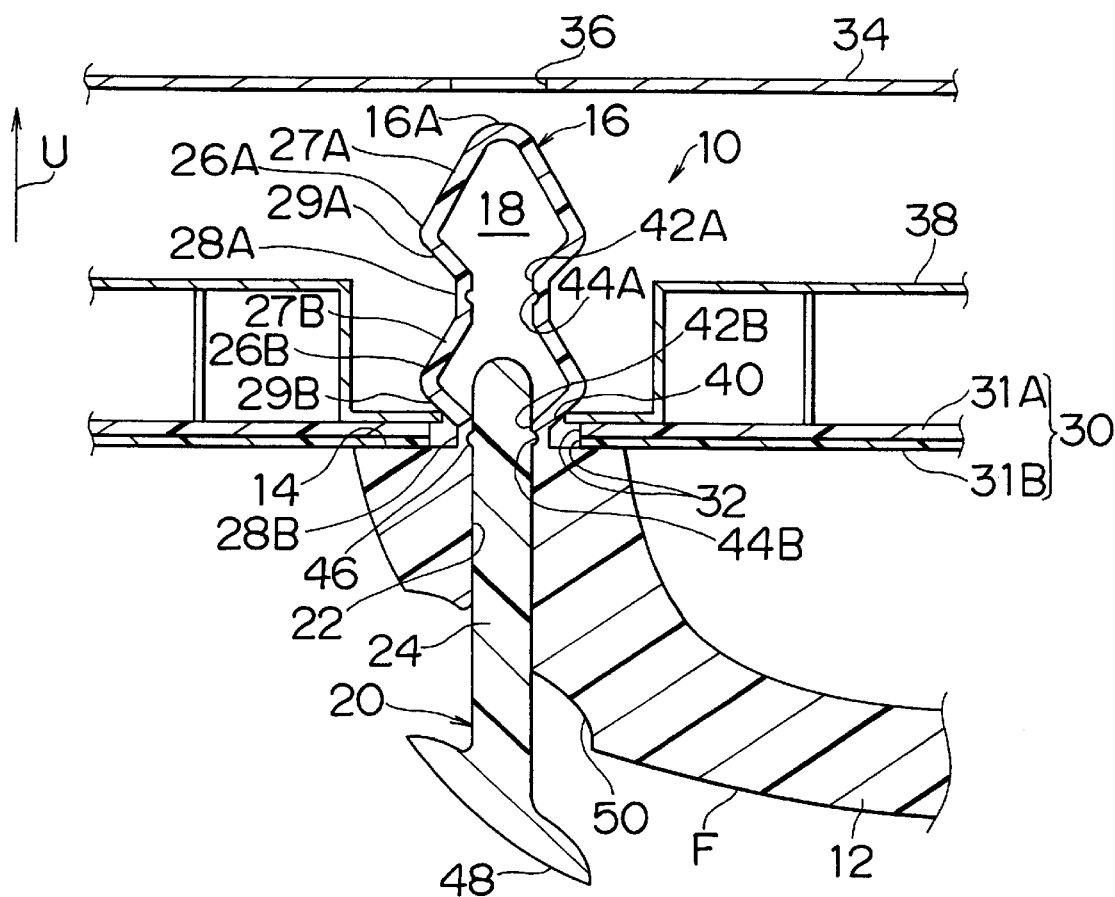
FIG. 4 is a side elevational view useful for explaining an assist grip attaching method according to the present invention, which view shows in cross section the assist grip when it is assembled with the ceiling base member and an EA member.

While the contractible member 16 is held in the normal state with no force applied thereto, as shown in FIG. 4, the width of the large-width portions 26A, 26B is larger than those of an attachment hole 32 formed in the ceiling base member 30, attachment hole 36 formed in the body 34, and an attachment hole 40 of the EA member 38 interposed between the ceiling base member 30 and the body 34. When the contractible member 16 is contracted to a certain width, the width of the large-width portions 26A, 26B is reduced to be smaller than those of the attachment holes 32, 36 and 40.

The small-width portions 28A, 28B have a width that is smaller than those of the attachment holes 32, 36 and 40 so as to be inserted therethrough. The distances between the inner wall surfaces 42A of the small-width portion 28A and between the inner wall surfaces 42B of the small-width portion 28B are made substantially equal to the width of the through hole 22. When the lock pin 20 is inserted through the through hole 22 into the space 18, therefore, the pin body 24 is brought into contact with the inner wall surfaces 42A, 42B with substantially no clearance therebetween.

The inner wall surfaces 42A, 42B have respective grooves 44A, 44B formed therein for engagement with projections 46 of the lock pin 20 which will be now described.

The projections 46 of the lock pin 20, each having a substantially semicircular cross-section, are formed on the opposite side faces of the distal end portion of the pin body 24. Each projection 46 projects in the direction perpendicular to the axis of the pin body 24, and extends over the entire depth of the pin body 24.

The height of the projections 46 is determined so that the lock pin 20 can be inserted from the front surface F into the through hole 22 while elastically deforming and expanding the inner wall of the through hole 22 and also sliding against the inner wall of the through hole 22. During the insertion of the lock pin 20, therefore, a load arises due to the friction between the inner wall surface of the through hole 22 and the projections 46. Nevertheless, the frictional force applied in the direction of the insertion may be reduced to some extent since the projections 46 having a substantially semicircular cross-sectional shape have a reduced contact area with the inner wall surface of the through hole 22.

The projections 46 are adapted to engage with the grooves 44A, 44B formed in the inner wall surfaces 42A, 42B of the contractible member 16. The grooves 44A, 44B are formed in a substantially semicircular shape that almost matches the shape of the projections 46. The size of each groove 44A, 44B is slightly larger than that of the projections 46 such that the projections 46 can be fitted in the grooves 44A, 44B with almost no play.

The relationship between the lock pin 20, and the contractible member 16 and the space 18 (engagement of the lock pin 20 with the member 16) will be now explained. When the lock pin 20 inserted through the through hole 22 is located at a position (standby position) at which the projections 46 engage with the grooves 44B, as shown in FIG. 4, the tip or distal end of the pin body 24 does not reach the inner wall surfaces 42A of the contractible member 16.

When the lock pin 20 is located at this standby position, therefore, the contractible member 16 is elastically deformable in the width direction such that the large-width portions 26A, 26B can move inwards in the width direction.

If the lock pin 20 is further pressed into the contractible member 16 so that the projections 46 proceed into the space 18, the lock pin 20 is brought into the position as shown in FIG. 3 in which the projections 46 engage with the grooves 44A. In this position, the distal end portion of the pin body 24 is held in contact with the inner wall surfaces 42A of the contractible member 16 with substantially no clearance therebetween, and therefore elastic deformation of the contractible member 16 is restricted or limited.

With the lock pin 20 placed in the position of FIG. 3, a flange 48 in the form of a rectangular board formed at the bottom of the lock pin 20 is fitted in a recess 50 formed in the lower end portion of the through hole 22. With the flange 48 thus received in the recess 50, the surface of the flange 48 is flush with the surface F of the grip body 12, as shown in FIG. 3.

A method of attaching an assist grip to a vehicle body according to the present embodiment and its advantages will be now described.

First, the lock pin 20 is pre-mounted in the grip body 12 of the assist grip 10. More specifically, the lock pin 20 is inserted through the through hole 22 of the grip body 12 until it reaches the standby position at which the projections 46 engage with the grooves 44B.

Next, as shown in FIG. 4, the EA member 38 is superposed on the ceiling base member 30 at a predetermined orientation with the attachment hole 40 of the EA member 38 aligned with the attachment hole 32 of the ceiling base member 30. The contractible member 16 of the assist grip 20 is then pressed to be inserted through the attachment holes 32, 40 that are aligned with each other.

Since the contractible member 16 is in the normal or non contracted state before the insertion thereof, the width of the large-width portions 26A, 26B is larger than those of the attachment holes 32, 40. However, the contractible member 16 can be readily forced to pass through the attachment holes 32, 40, since the tapered portion 27A formed at the distal end of the contractible member 16 makes it easy to deform the large-width portions 26A, 26B inwards thereby to contract the member 16 in the width direction.

In the above manner, the contractible member 16 can be fitted in the attachment holes 32, 40. Also, the insertion of the contractible member 16 through the attachment holes 32, 40 can be accomplished with a reduced load since the tapered portions 27A, 27B permits the member 16 to smoothly pass through the attachment holes 32, 40.

If the contractible member 16 is pressed through the attachment holes 32, 40 until the attachment surface 14 of the grip body 12 abuts on the ceiling base member 30, the small-width portion 28B is fitted in the attachment holes 32, 40. At the same time, the contractible member 16 returns to the normal or non-contracted state by use of its own elastic force. As a result, the width of the large-width portions 26A, 26B becomes larger than those of the attachment holes 32, 40 again.

In this manner, the ceiling base member 30 and EA member 38 are sandwiched or gripped between the tapered portion 29B of the contractible member 16 and the attachment surface 14 of the grip body 12. Thus, the assist grip 10, ceiling base member 30 and the EA member 38 are assembled together into a unit.

In this state, the tapered portion 29B presses the periphery or edge of the attachment hole 40 of the EA member 38 with the elastic force of the expandable/contractible member 16. By holding the assist grip 10, therefore, the ceiling base member 30 and EA member 38 may be carried along with the assist grip 10 such that these members 30, 38 are unlikely to be displaced relative to the assist grip 10.

The assist grip 10 thus assembled as a unit with the ceiling base member 30 and EA member 28 is then attached to the vehicle body 34 by holding the grip body 12 of the assist grip 10 so as to lift the ceiling base member 30 and EA member 38, and forcing the contractible member 16 to pass through the attachment hole 36 in the body 34 (in the direction as indicated by arrow U) in the same manner as in the case of assembling the assist grip 10 with the ceiling base member 30 and EA member 28.

Figure 5:
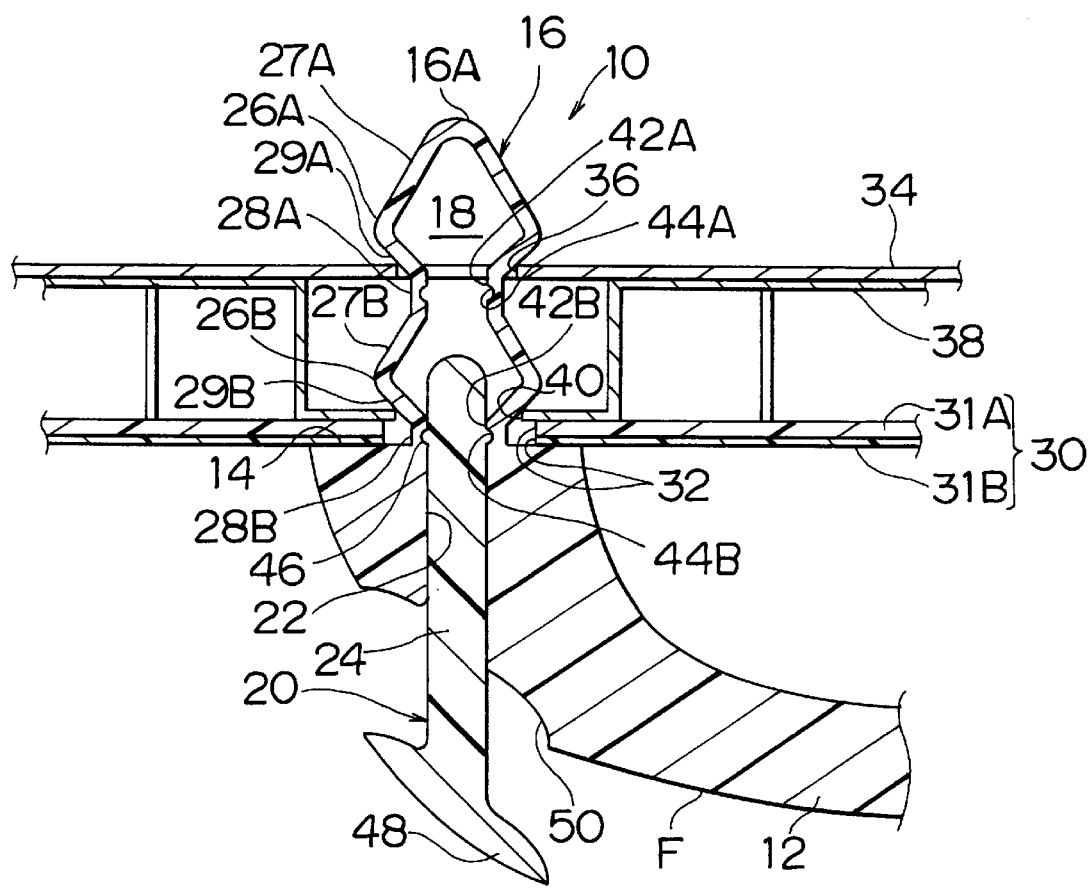
FIG. 5 is a side elevational view useful for explaining the assist grip attaching method according to the invention, which view shows in cross section the assist grip when it is tentatively attached to the vehicle body.
Figure 6A:
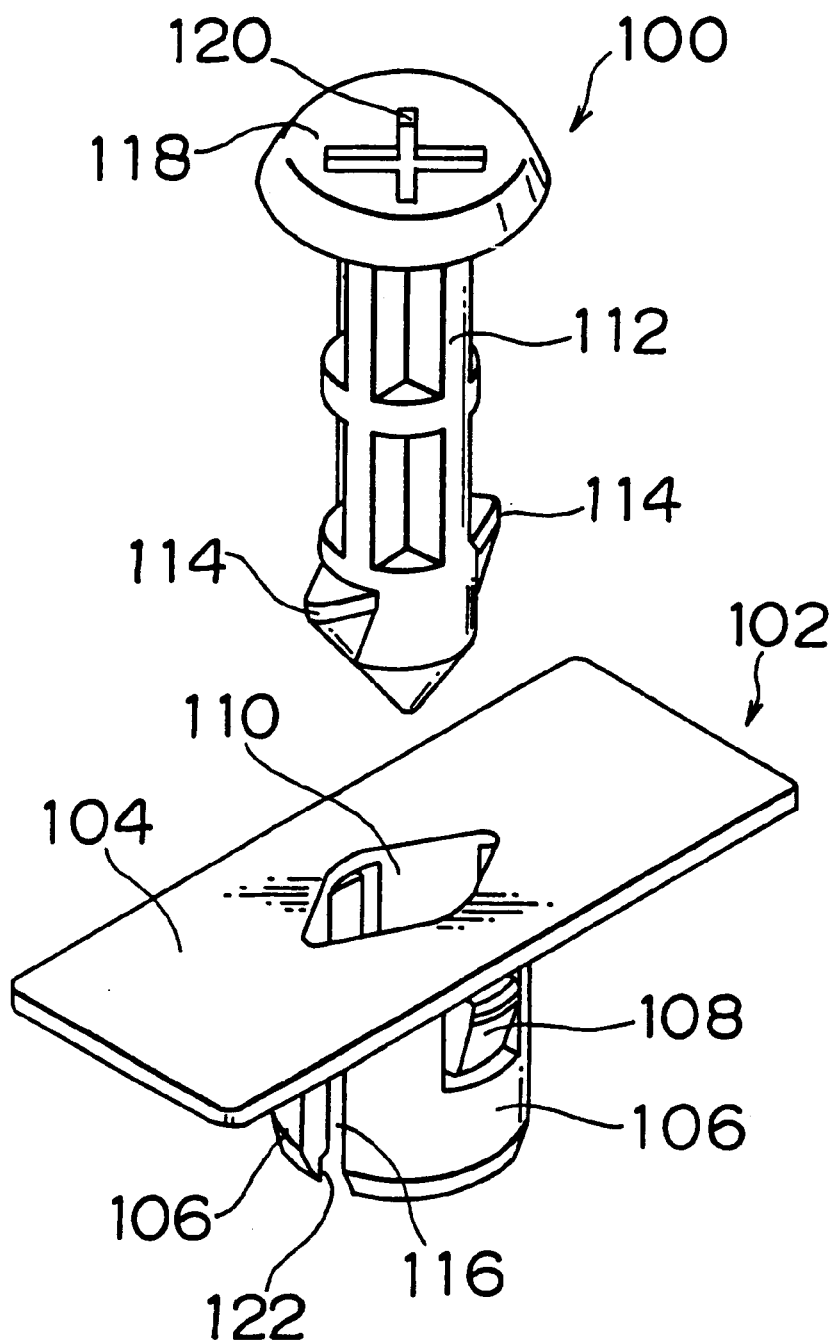
FIG. 6A is a perspective view showing a pin member and a grommet used in a known structure for attaching an assist grip to a vehicle body.
Figure 6B:
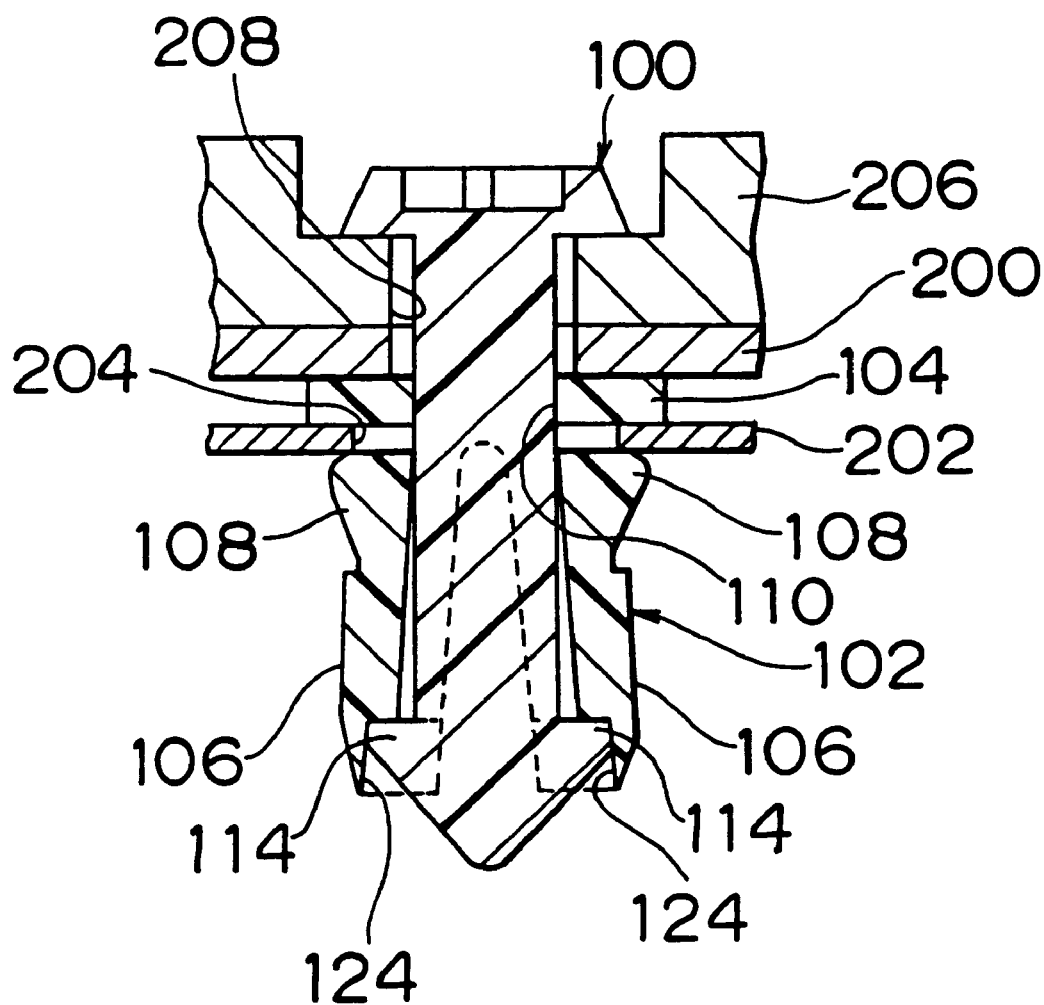
FIG. 6B is a side elevational view showing in cross section the attachment structure of FIG. 6A in which the pin member is received in the grommet.

Here, the large-width portion 26A of the contractible member 16, when it is in the normal state, has a larger width than the attachment hole 36. If the contractible member 16 is pressed through the attachment hole 36, however, the large-width portion 26A moves inwards so that the small-width portion 28A of the contractible member 16 is fitted in the attachment hole 36. At this time, due to the elastic force of the contractible member 16, the tapered portion 29A is kept in engagement with the periphery or edge of the attachment hole 36. Thus, as shown in FIG. 5, the assist grip 10 is tentatively attached to the vehicle body 34 together with the ceiling base member 30 and EA member 38.

Finally, the lock pin 20 is pressed into the contractible member 16 toward the ceiling until the projections 46 are brought into engagement with the grooves 44A. Thus, the assist grip 10 is mounted in place as shown in FIGS. 1 and 3.

In this condition, the pin body 24 of the lock pin 20 is in contact with the inner wall surfaces 42A of the small-width portion 28A, thus reliably preventing the contractible member 16 from contracting. Thus, even when the assist grip 10 is pulled away from the ceiling, the largewidth portion 26A of the contractible member 16 is not displaced or pulled out through the attachment hole 36 of the body 34.

With the attachment structure for the assist grip according to the present embodiment as described above, the assist grip 10 can be easily attached to the body 34 by performing a simple operation as follows. Initially, the contractible member 16 formed integrally on the grip body 12 of the assist grip 10 is fitted into the attachment holes 32, 40 of the ceiling base member 30 and EA member 38, to provide a unit structure or assembly, and then further fitted into the attachment hole 36 of the body 34. These steps are then followed by the step of inserting the lock pin 20 into the space 18 of the contractible member 16. Thus, the assist grip 10 can be readily attached to the body 34 with an improved work efficiency.

Moreover, in the present embodiment, the contractible member 16 and the grip body 12 are both formed of synthetic resin. Thus, the contractible member 16, which is normally in the non-contracted state, may be elastically deformed to be contracted, and then return to the normal state utilizing its own elastic force.

With this arrangement, the assist grip 10 can be tentatively attached to the body 34 simply by fitting the contractible member 16 into the attachment hole 36. Thus, the attaching operation can be accomplished with further improved efficiency.

Moreover, in this embodiment, the contractible member 16 is first assembled with the ceiling base member 30 and EA member 38 into a unit structure, and then, fitted in the attachment hole 36 of the body 34. With this attachment procedure, the ceiling base member 30 and EA member 38 can be attached to the vehicle body 34 while being supported by the assist grip 10, thus assuring improved efficiency with which the ceiling base member 30 is mounted.

Also, the attachment procedure as described above can eliminate disadvantages such as reduced handling ease that would occur when a thin, lightweight ceiling base member 30 is used. This facilitates the attaching operation, and also permits further reduction in the thickness and weight of the ceiling base member 30.

In the present embodiment, upon attachment of the assist grip, the lock pin 20 can be pre-mounted in the grip body 12 by engaging the projections 46 of the lock pin 20 with the grooves 44B. In this pre-mounted state, the contractible member 16 may be contracted. Accordingly, the assist grip 10 can be attached simply by fitting the contractible member 16 in the attachment hole 36 of the body 34 and then pressing the lock pin 20 into the space 18 up to the position where the projections 46 engage with the grooves 44A. Thus, the attaching operation is further simplified.

In the state in which the lock pin 20 has been inserted up to the above-described position, the lock pin 20 is held at the same position due to the engagement of the projections 46 with the grooves 44A, and therefore the lock pin 20 can be surely fixed in position within the space 18.

Moreover, pre-mounting of the lock pin 20 in the assist grip 10 may avoid undesirable situations, such as dropping or losing the lock pin 20 during the attaching operation.

Furthermore, in this embodiment, the assist grip 10 is attached to the vehicle body with the EA member 38 interposed between the body 34 and the ceiling base member 30. In this case, the assist grip 10 can be assembled as a unit with the EA member 28 as well as the ceiling base member 30, by using the attachment hole 40 of the EA member 38. With this arrangement, even when the thickness of the ceiling base member 30 is reduced, the EA member 38 compensates for the reduced rigidity, while improving the handling ease during transportation or attachment.

Moreover, the ceiling base member 30 and EA member 38 are formed as separate members, and therefore can be easily designed and produced by a suitably selected method, to provide suitably selected characteristics. Depending on the manufacturing method thus selected, the EA member 38 may be formed integrally with the ceiling base member 30.

In the attachment structure for the assist grip according to the present embodiment, the contractible member 16 is adapted to contract and then expand in the width direction, and is formed with the large-width portions 26A, 26B and small-width portions 28A, 28B. The shape of the contractible member, however, is not limited to that of the illustrated embodiment. The contractible member is only required to include a large-sized portion(s) that is larger than the attachment hole(s) when the member is in the normal state, but smaller than the attachment hole(s) when the member is in the contracted state, and a small-sized portion(s) that can be fitted in the attachment hole(s) when the member is in the normal state. For example, the contractible member may have another shape, such as a cylindrical shape, which allows the contractible member to be contracted and then expanded in the radial direction.

Moreover, the member interposed between the body and the ceiling base member is not limited to the EA member as used in the illustrated embodiment, but a soundproof member, sound-absorbing member or other member may be interposed between the body and the ceiling base member.

What is claimed is:

1. An attachment structure with which an assist grip is attached to a vehicle body with a ceiling base member interposed therebetween, comprising:

a grip body configured and positioned to be held by a passenger;

a contractible member formed integrally with the grip body and inserted through a first attachment hole formed in the ceiling base member and a second attachment hole formed in the vehicle body, said contractible member having a space formed therein which allows the contractible member to be contracted; and an insertion member that is inserted into the space of the contractible member, to reach a locking position at which the insertion member restricts contraction of the contractible member, wherein said contractible member includes at least one large-sized portion having an outside dimension that is larger than corresponding dimensions of the first and second attachment holes when the contractible member is in a non-contracted state, said contractible member being able to be contracted while the insertion member is not located at said locking position so that said outside dimension of the large-sized portion becomes smaller than the corresponding dimensions of the first and second attachment holes, said contractible member further includes two small-sized portions that are dimensioned to be fitted in the first and second attachment holes when the insertion member is located at said locking position, and one of the at least one large-sized portion is located between the first and second attachment holes while the two small-sized portions are respectively fitted in the first and second attachment holes.

2. An attachment structure according to claim 1, wherein said contractible member comprises an elastic body.

3. An attachment structure according to claim 2, further comprising a member that is interposed between the vehicle body and the ceiling base member.

4. An attachment structure according to claim 2, wherein the insertion member includes an engagement portion, and the contractible member includes a first engagement portion and a second engagement portion formed at an inner wall surface thereof, said engagement portion of the insertion member engaging with the first engagement portion of the contractible member when the insertion member is located at a non-locking position at which the contractible member may be contracted so that the outside dimension of the large-sized portion becomes smaller than the corresponding dimensions of the first and second attachment holes, said engagement portion of the insertion member engaging with the second engagement portion of the contractible member when the insertion member is located at the locking position at which the insertion member restricts contraction of the contractible member.

5. An attachment structure according to claim 4, further comprising a member that is interposed between the vehicle body and the ceiling base member.

6. An attachment structure according to claim 1, wherein the insertion member includes an engagement portion, and the contractible member includes a first engagement portion and a second engagement portion formed at an inner wall surface thereof, said engagement portion of the insertion member engaging with the first engagement portion of the contractible member when the insertion member is located at a non-locking position at which the contractible member may be contracted so that the outside dimension of the large-sized portion becomes smaller than the corresponding dimensions of the first and second attachment holes, said engagement portion of the insertion member engaging with the second engagement portion of the contractible member when the insertion member is located at the locking position at which the insertion member restricts contraction of the contractible member.

7. An attachment structure according to claim 1, further comprising a member that is interposed between the vehicle body and the ceiling base member.

* * * * *